No. 746,513. PATENTED DEC. 8, 1903.
F. E. HUTCHINS.
INSTRUMENT FOR MEASURING ANGLES.
APPLICATION FILED NOV. 5, 1902.
NO MODEL. 3 SHEETS—SHEET 1.

Witnesses
R. A. Boswell.
George M. Anderson.

Inventor
Francis E. Hutchins
By E. W. Anderson
his Attorney.

No. 746,513. PATENTED DEC. 8, 1903.
F. E. HUTCHINS.
INSTRUMENT FOR MEASURING ANGLES.
APPLICATION FILED NOV. 5, 1902.
NO MODEL. 3 SHEETS—SHEET 2.

Witnesses
R. A. Boswell
George M. Anderson

Inventor
Francis E. Hutchins
By
E. W. Anderson
his Attorney

No. 746,513. PATENTED DEC. 8, 1903.
F. E. HUTCHINS.
INSTRUMENT FOR MEASURING ANGLES.
APPLICATION FILED NOV. 5, 1902.
NO MODEL. 3 SHEETS—SHEET 3.

Witnesses
R. A. Boswell
George M. Anderson

Francis E. Hutchins, Inventor
By E. W. Anderson
his Attorney

No. 746,513. Patented December 8, 1903.

UNITED STATES PATENT OFFICE.

FRANCIS EDWIN HUTCHINS, OF WARREN, OHIO.

INSTRUMENT FOR MEASURING ANGLES.

SPECIFICATION forming part of Letters Patent No. 746,513, dated December 8, 1903.

Application filed November 5, 1902. Serial No. 130,202. (No model.)

*To all whom it may concern:*

Be it known that I, FRANCIS EDWIN HUTCHINS, a citizen of the United States, and a resident of Warren, in the county of Trumbull and State of Ohio, have made a certain new and useful Invention in Instruments for Measuring Angles; and I declare the following to be a full, clear, and exact description of the same, such as will enable others skilled in the art to which it appertains to make and use the invention, reference being had to the accompanying drawings, and to letters and figures of reference marked thereon, which form a part of this specification.

Figure 1:
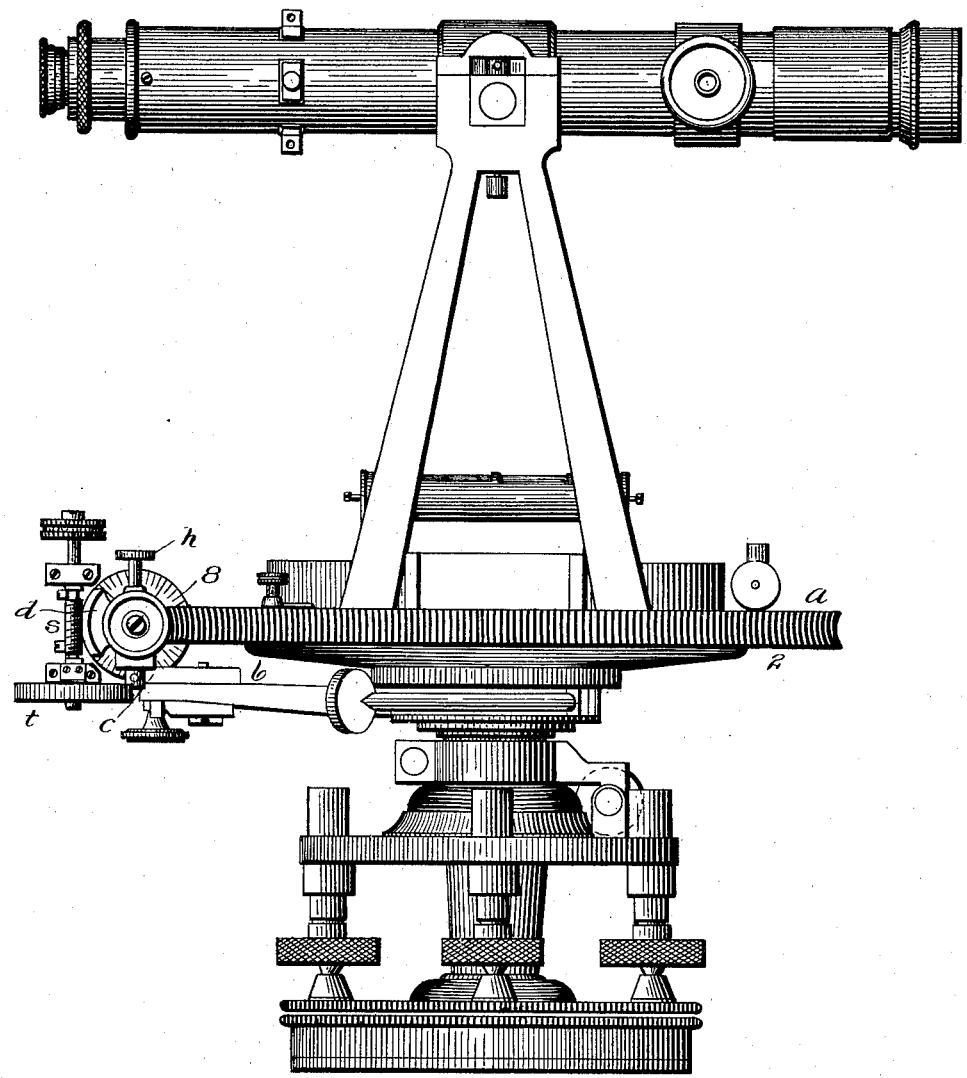
Figure 2:
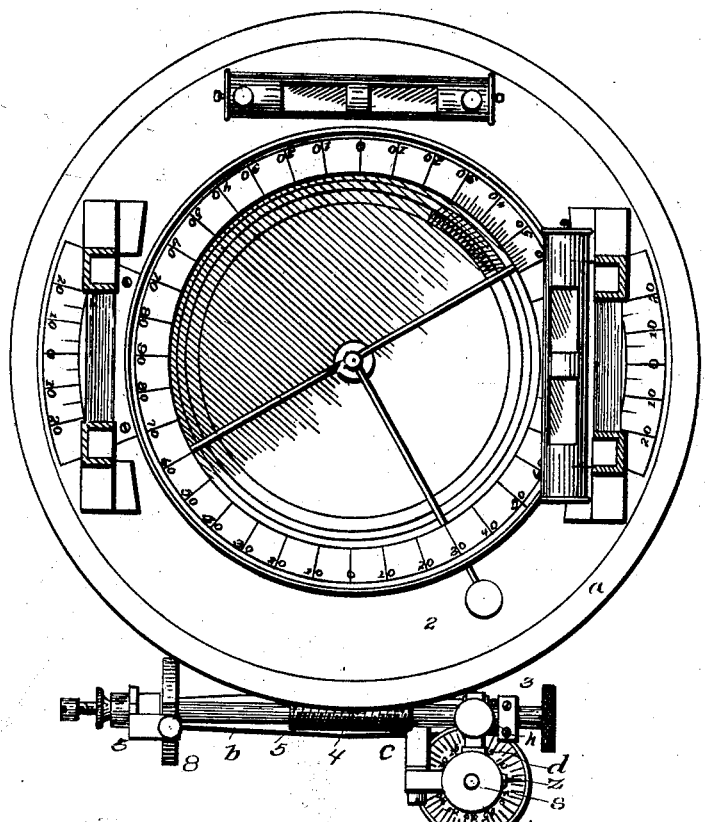
Figure 3:
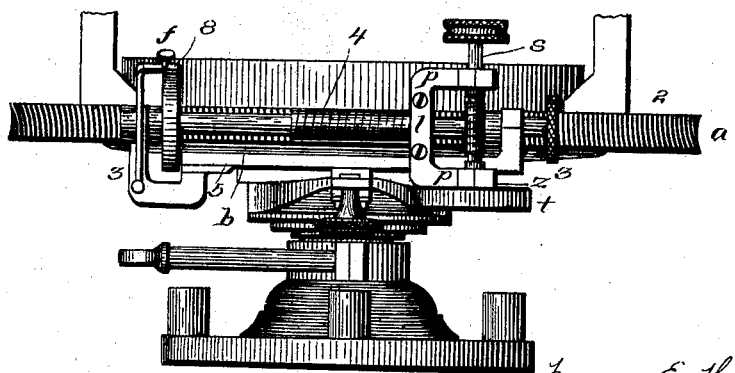
Figure 4:
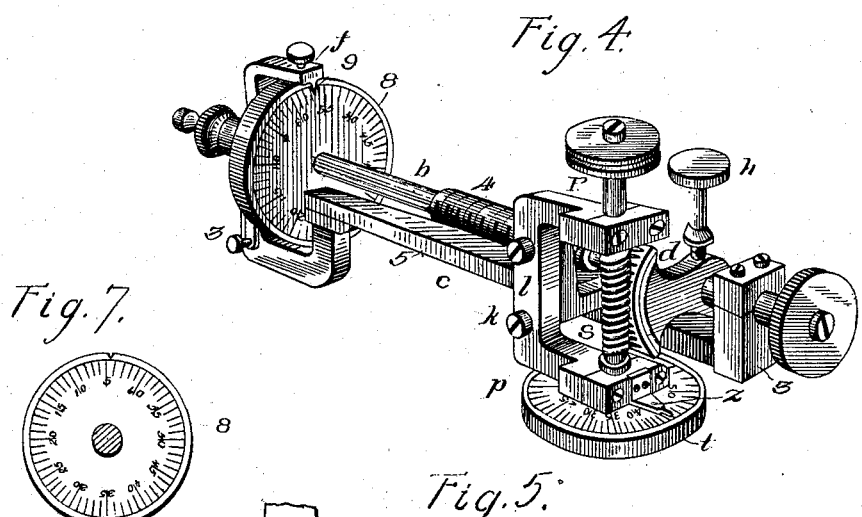
Figure 7:
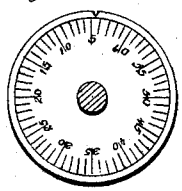
Figure 5:
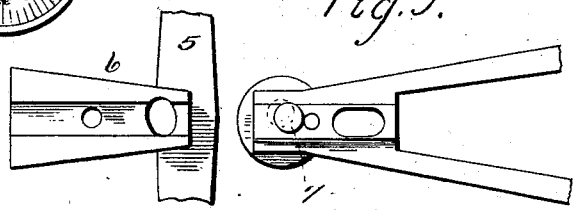
Figure 6:
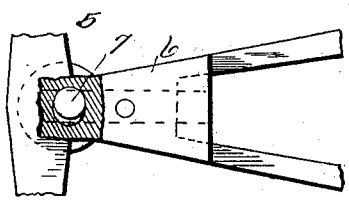

Figure 1 is a side elevation showing the invention. Fig. 2 is a top view without the telescope. Fig. 3 is a front view without the telescope. Fig. 4 is a perspective view of the tangent minute-screw and its connections. Figs. 5, 6, and 7 are views of details.

My invention or device is designed to provide for the accurate measurement of angles. It is here described chiefly in its application to the ordinary transit instrument, although upon the same principle it may be applied to the theodolite or to other instruments for measuring angles. Applied to the transit it consists of the rim $a$, reinforcing the upper circular plate 2, carrying the telescope, compass-box, and level to such circumference that three hundred and sixty equidistant threads or teeth with the pitch that may be selected will exactly compass it. The periphery of this rim is grooved and cut with three hundred and sixty threads or teeth representing degrees, with the pitch stated later herein.

The minutes-screw $b$ tangent to the rim $a$ is supported by the uprights 3 of the frame $c$. The middle portion 4 of this minutes-screw is cut with threads or teeth corresponding with and serving to engage the threads or teeth in the rim aforesaid, so as to form a screw-gear for rotating the upper circular plate by turning the minutes-screw. The pitch of the threads in both pieces is such that one revolution of the minutes-screw will move the upper circular plate just one degree.

The frame $c$ consists of a bar 5, (in this case horizontal,) having a lateral projection 6 near the middle for attachment to the clamp or if the instrument has no clamp then to the lower circular plate or to some part of the instrument that can be fixed while the upper circular plate rotates, there being at each end of the bar an upright 3, through which the minutes-screw passes, the whole forming the support and bearings for the minutes-screw. This attachment of the frame to the clamp or other portion of the instrument is adjustable, so as to permit a slight movement of the frame $c$ from and toward the center, so as to engage and disengage the threads of the screw-gear aforesaid. This movement is accomplished by an eccentric 7, moving in a slot at the place of attachment and having a stem and head for manipulation, the arrangement being such that a quarter-revolution of the eccentric will move the frame so as to engage or disengage the threads of the screw-gear aforesaid. Near the upright at one end this minutes-screw passes through a vertical dial 8, called the "minutes-dial," and is so adjusted that the minutes-screw may be rotated while the dial remains stationary, or both may be moved together and will so move together when the minutes-screw turns, unless the dial is fastened, as by the dial-screw mentioned later. This dial 8 is graduated by lines on its face at the edge into sixty equal parts for minutes. These lines are numbered by fives from "1" to "60." A stationary index or pointer is arranged close to the edge of the face of the dial in such wise that as it revolves its lines and figures of graduation will move directly past the point of the index. The upright above referred to near the dial is usually designed to serve as this stationary index or pointer in this way: The upright is extended so as to pass up to the edge of the dial, then across its edge and downward, being brought to a point a short distance down the face of the dial. Past the point of this index the lines and figures revolve as the dial turns. Through that portion of this upright which crosses the edge of the dial the "dial-screw" $f$ passes into the groove 9 on the edge of the dial. Across the edge of the minutes-dial (or of a shallow casing containing it) is cut this small groove 9, which is designed to coincide with the zero-mark, or "60," on the dial, and into this groove the pointed end of the dial-screw $f$ passes, thus fastening the dial with the index at "60," while the minutes-screw may revolve, the whole being so arranged as to fasten the dial where the index points to zero, or "60." At the other end, and outside of that upright, this minutes-screw has a milled head for manipulation. This completes the minutes device, in which it is apparent that the minutes-screw will serve also every purpose of the tangent-screw in the ordinary transit, besides measuring and indicating correctly the micrometer movement. Toward its head the minutes-screw $b$ aforesaid passes through the center of a sector $d$, through the hub of which a set-screw $h$ (herein called the "sector-screw") passes to and against the shaft of the minutes-screw and when tightened serves to fix the sector to the minutes-screw and when loosened permits the minutes-screw to turn while the sector remains stationary. The periphery of this sector is cut into threads or teeth corresponding with and serving to engage those on the seconds-screw mentioned later herein.

Either mounted upon or forming part of the frame $c$ aforesaid is another frame $k$, consisting of a bar $l$, (in this case vertical,) having an offset $p$ (in this case horizontal) at each end, through which the seconds-screw $s$ passes, the whole forming a support and bearings for the seconds-screws. The seconds-screw $s$, which passes through the offsets of the frame $k$ and directly in front of and tangent to and in contact with the periphery of the sector $d$. The middle portion of this seconds-screw is cut in threads or teeth to correspond with and to always engage those on the periphery of the sector, thus forming a screw-gear for the partial rotation of the minutes-screw by turning this seconds-screw. The threads of this seconds-screw and those of the sector and the radius of the sector are such that one revolution of the seconds-screw will turn the minutes-screw just one-sixtieth of a revolution, or one minute. At the lower end this seconds-screw is fastened through the center of a dial $t$, which is graduated into sixty equal parts for seconds and numbered like the minutes-dial first described and which as the seconds-screw is turned revolves its lines and figures past a stationary index or pointer $z$ to indicate the movement in seconds. At the other end this screw has a milled head for manipulation.

When the clamp or other part on which the frame C is mounted is fastened and the threads of the minutes-screw and of the rim are engaged, it is apparent that the upper circular plate cannot be turned except by turning the minutes-screw and that when the sector-screw is also tightened neither that plate nor the minutes-screw can be turned except by turning the seconds-screw. Now when in this situation the first screw-gear is disengaged and the upper circular plate turned it is evident that the threads of these parts will not mesh or engage again, the minutes-screw remaining fixed, unless the movement of the upper circular plate has been one or more whole degrees and that the needle or vernier will tell the number of those degrees. This is the basic principle of the whole device.

The operation is here explained by a single instance—namely, required, the angle between two objects. Having adjusted the instrument as in ordinary cases, then, with the first-mentioned screw-gear disengaged, the dial-screw tightened with its pointer at "60," and the sector-screw loosened, point the telescope at the first object and with the eccentric engage the threads of the first screw-gear. Now if the glass does not still point exactly at the object move it by turning the minutes-screw. Note the course. If the needle is not exactly on a degree-mark, call the course, that which is indicated by the degree-mark nearest the needle on that side of it next to the north pole of the compass-box if the course is northerly and the one next the south pole if the course is southerly. Read this way. We will say the course is N. 6° W. Pay no attention to the minutes. Now tighten the sector-screw, so as to rigidly fix the minutes-screw. Then with the eccentric disengage that screw-gear and move the glass until it points at the second object. Now with the eccentric, assisted by gentle movements to and fro of the upper circular plate, with the hand engage the screw-gear. The movement now will have been a certain number of whole degrees. This engagement may have thrown the glass away from the object; but if what is thus directed has been carefully done the glass will point within less than one degree toward the second object; but it may be more than that. In either case next loosen the sector-screw and the dial-screw and with the minutes-screw turn the glass to the second object, which may require one or more revolutions of that screw. Now note the course, as before, by taking the degree-mark nearest the needle, but on the same side of it as at the first time. Read in this way: the course is (we will say) N. 36° W. and the minutes-dial shows a further movement of (we will say) twenty minutes, which is to be added. If the pointer is between two minutes-lines and the seconds are required, turn the minutes-screw back until the pointer coincides with the next minutes-line. Then with the seconds-pointer at "60" of the seconds-dial fasten the sector-screw and with the seconds-screw move the glass until it sights the second object, the seconds-dial indicating (we will say) thirty seconds. Then the reading will be from the compass-box, N. 36° W.; from the minutes-dial, twenty minutes, and from the seconds-dial thirty seconds. Deducting the first course, six degrees, we have the exact movement, 30°, 20', 30'', which is the required angle. This measurement may be made in this way in a very expeditious manner inside of five minutes.

For convenience in reading it will be found preferable to use the instrument with the north pole of the compass-box toward the north and to read the course in the manner above indicated. It will also be found more convenient if, in making the second engagement of the screw-gear, as above, the circular-plate be so moved that the glass will be turned a little toward the first object, rather than beyond the second object.

This device is designed to be usually useful in triangulation and in all cases where the accurate measurement of an angle is required. As an attachment to an instrument for measuring angles it is designed to provide such means as will enable the operator to readily move the telescope any number of whole degress and by positive means to measure and indicate accurately the minutes of such movement beyond the whole degrees by one turn of a thumb-screw and by positive means to measure and indicate accurately the seconds of the movement beyond the minutes by one turn of another thumb-screw, the accuracy of the movement not being affected by any variation or declination of the magnetic needle.

The means of positive measurement and indication of the minutes and seconds herein described are designed to be distinguished from such means as involve the reading of an adjusted vernier in its relation to a graduated dial-plate, such means of reading being subject to the nervous personality of the operator, and therefore not mechanically positive, such as they are in the present invention, wherein the means which bring the dial-plates and indicators to their respective positions of exact measurement and indication are of mechanical character.

Having described my invention, what I claim, and desire to secure by Letters Patent, is—

1. In an instrument for measuring angles, the combination with the degree-plate, of the tangent minute-screw, its adjustable dial, the set-screw for said dial, and the indicator, substantially as specified.

2. In an instrument for measuring angles, the combination with a compass degree-plate, of a tangent minute-screw, its attached adjustable dial, the fixed indicator therefor, the sector-arm of said minute-screw, and a seconds-screw, its attached dial, and the fixed indicator therefor, substantially as specified.

3. In a micrometer attachment for a transit, comprising an attachment-frame, carrying a minute-screw, having a dial-plate, a seconds-screw having a dial-plate, indicators for such dial-plates, and means of engagement and disengagement between the minutes-screw and the seconds-screw, substantially as specified.

4. In an instrument for measuring angles, the combination with the degree-plate, of a tangent minute-screw having degree pitch, its dial-plate and indicator, and a seconds-screw having minute pitch, means of engagement between the minute-screw and the seconds-screw, and means of engagement between the minute-screw and said degree-plate, substantially as specified.

5. In an instrument for measuring angles, the combination with the compass degree-plate, of a radially-adjustable tangential minute-screw, and a seconds-screw, and means for detachably engaging said minute-screw and seconds-screw, substantially as specified.

6. In an instrument for measuring angles, the combination with the telescope, of means for moving the telescope any number of whole degrees, normally disconnected means of positive and even motion for measuring and indicating the minutes of the angle beyond the whole degrees, and normally disconnected means of positive and even movement of measuring and indicating the seconds of the angle beyond the minutes, substantially as specified.

7. In an instrument for measuring angles, the combination with the telescope, of means for moving the telescope and measuring and indicating the whole degrees of such movement, normally disconnected means for measuring and indicating the minutes of such movement beyond such whole degrees, and normally disconnected means for measuring and indicating the seconds of such movement beyond such whole degrees and minutes, substantially as specified.

8. In an instrument for measuring angles, the combination with the telescope, the degree-plate, and means for measuring broadly the whole degree movement, of normally disconnected means for measuring broadly the number of whole minutes beyond the whole degree, and normally disconnected means for measuring exactly the number of seconds beyond the whole minutes, and indicating exactly the degrees, minutes and seconds of the entire reading, substantially as specified.

In testimony whereof I affix my signature in presence of two witnesses.

FRANCIS EDWIN HUTCHINS.

Witnesses:
HERBERT C. EMERY,
N. G. MCCARTHY.